United States Patent Office 3,377,205
Patented Apr. 9, 1968

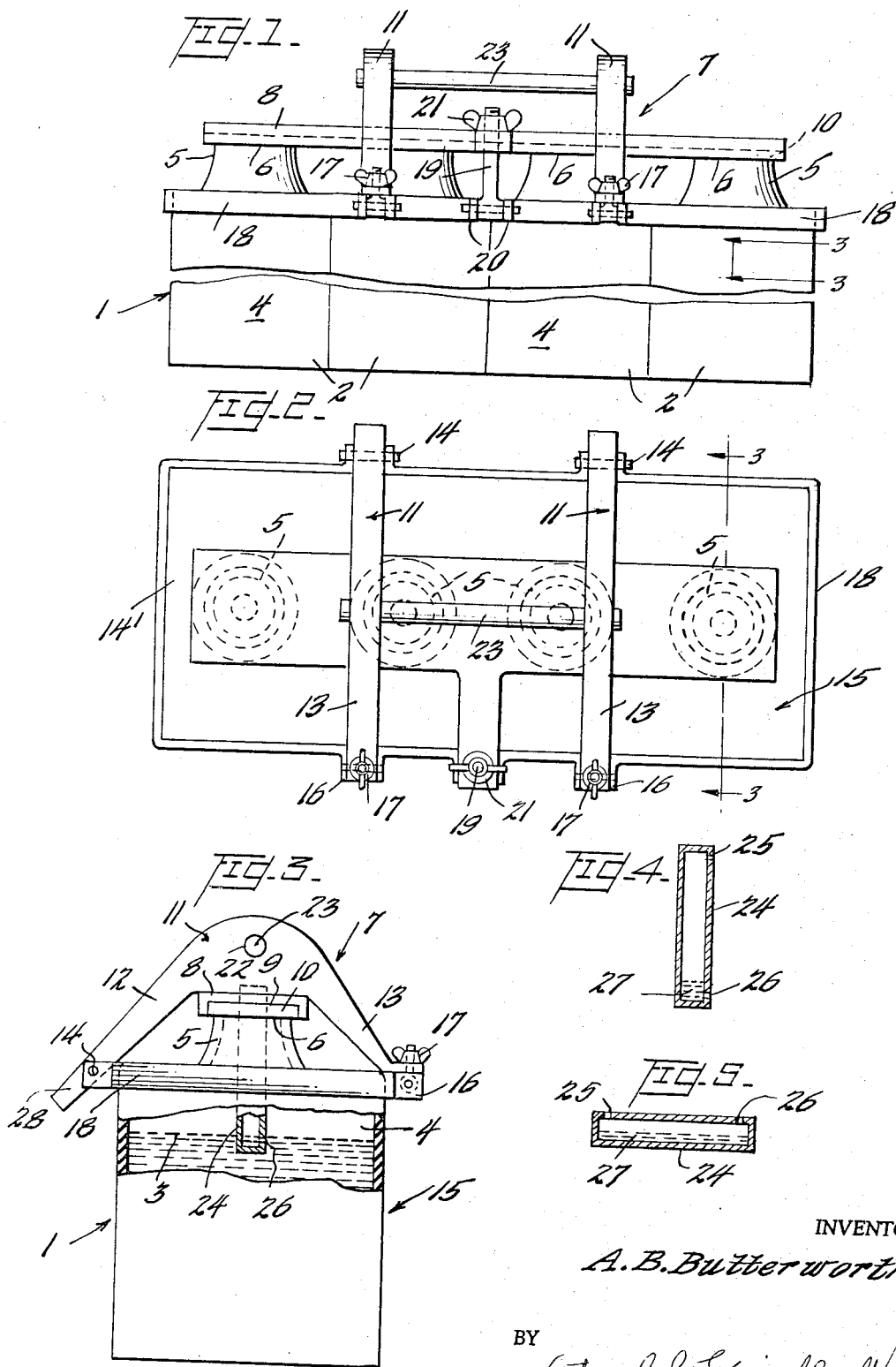

3,377,205
COMBINED BATTERY LIFTER AND GAGE
Arthur B. Butterworth, Ashbrook-on-the-James,
Smithfield, Va. 23430
Filed Oct. 4, 1965, Ser. No. 492,539
6 Claims. (Cl. 136—170)

ABSTRACT OF THE DISCLOSURE

A combined battery handle and cover for the cells of the battery with a bar extending across all the cell openings and having a gage for each cell connected to the bar with the latter when lifted raising all the gages simultaneously to determine the liquid level in all the cells.

---

This invention relates to a combined battery lifter handle and cap remover for all types of acid battery cells such as those to mention one use, for automobiles, buses, boats, etc.

It is an object of this invention to provide a permanent handle for the battery for use in lifting the battery out of its usual box, receptacle or support and to transport the battery manually from one place to another. A further object of the invention resides in a combined structure in which the handle also has means thereon to act as closures for the openings of the cells of the battery. A still further object of the invention resides in the provision of gages for each cell attached to the opening of each cell so that when the combined handle and closure caps are lifted, the gages will indicate the amount of fluid in each battery cell.

Further objects will be apparent from the following description when considered in connection with the accompanying drawing in which:

FIGURE 1 is a side elevation partly in section of a battery with the combination gang lifting device for battery level inspection in closed cap position.

FIG. 2 is a top plan view of the battery of FIG. 1.

FIG. 3 is an end elevation partly in section of the battery of FIGS. 1 and 2, the section being taken on line 3—3 of FIGS. 1 and 2.

FIG. 4 is a longitudinal cross section of the level gage, with liquid therein, and FIG. 5 is a longitudinal section of the gage of FIG. 4 in a different position.

The battery 1 is a type of the usual acid fluid in a plurality of cells 2 in which the fluid 3 is required to cover the usual plates, not shown, in each cell 4. There is an opening in each cell and provided with a filling neck portion 5 with a top peripheral rim 6 for each cell.

The lifting handle 7 is composed of a longitudinally extending flat bar 8 having a depressed portion 9 to receive a gasket 10. At least two arch-shaped beams 11 are provided from which the bar 8 is suspended and these beams 11 have two legs 12 and 13 of which the leg 12 is pivotally hinged at 14 and the other leg 13 may be clamped to the top plate 14' of the battery box 15 at 16 and secured by a winged nut 17. A band 18 as shown in FIG. 1 may be provided around the upper rim of the battery box and a clamp pin 19 may be secured to the ends 20 thereof to which the winged nut 21 is provided.

Handle 23 is secured through holes 22 in the saddle beams 11 and such handle may be round or may comprise any other configuration.

Each gasket 10 is composed of a pliable acid resistant material which may comprise a suitable plastic material.

A gage tube 24 is secured to the covering strip or bar 8, one for each cell of the battery and each tube extends through the gasket 10 with a tight fit. Each tube 24 has a top vent hole 25 and a bottom vent hole 26 to permit entry of the fluid in the battery with the top vent 25 permitting escape of air.

As shown in FIG. 1 the gasket 10 may comprise a continuous strip so that the gasket will seal all the neck portions 5 so that it is not necessary to center each neck portion on an individual gasket.

FIGS. 1 and 2 show the device in a position to lift the battery by the handle 23 and when the wing nut 21 is removed or loosened the handle and strip 8 as well as the gaske 10 and the gages 24 are raised with the gages thus exposing the amount 27 of fluid in each gage thus indicating the level 3 of fluid in the cells in the battery. When the handle 23 is pulled up all the way counter-clockwise around the pivot 14 until end portion 28, FIG. 3 abuts against the casing, the gages 24 will be approximately horizontal, FIG. 5, so that the amount of fluid in the gage can be accurately determined since the fluid will not run out of the vent holes 25 and 26 as they are both on top.

The idea, in general, of this invention is to provide a present day acid battery with a combination framework on top whereby exposing the battery cell interior for inspecting the amount of liquid in each cell, by slackening only one wing bolt 21 on the side, instead of unscrewing the cover on each cell. This device can be used on any number or arrangement of cells. When the handle 23 is lifted fully and retarder 28 rests on the side of the battery, the tubes 24 are in a horizontal position and holds the liquid within since the pin holes 25 and 26 are on the top side. When inspection is completed and lifter is in locked position, the pin holes, one top and one on the bottom of the tube, are in position to allow the tube to again refill to the battery liquid level.

When in locked position the battery can be lifted out of its case or container and safely carried to any location if desired.

All parts of the device exposed to fumes such as the frame, gasket, etc., should be made of a material immune from battery acid fumes. Preferably plastic material on the framework and spun glass, etc., for the gasket may be used, which must be pliable.

The sealing gasket 10 should run the full length of the covering bar 8 in order to take care of any slight out of line or slight difference in distance between the cell openings. Therefore, this arrangement would be preferable on a gang of fixed position covers. The material could be spun glass and vent any gases when charging as this porous material would act as vent off for gas accumulation and also filter out any foreign matter from entering the battery through an open vent hole, even a small one.

As shown in FIG. 3 the fluid level 3 is just above the bottom of the gage tube 24 and the vent 25 is provided above the gasket 10 and beam 18 to vent built up gas pressure.

I claim:

1. A combined battery handle and cover for the cells of the battery comprising a bar extending across the length of the battery and over the openings of the cells of the battery, means to pivot the bar on the battery, a handle for the bar, a gasket secured to the bar and adapted to seat on the outer ends of the openings of the cells, means to releasably lock the handle on the battery, a fluid gage for each opening and secured to the bar and extending through the opening and into the fluid in the battery, and means connected to the handle to raise the gages when the handle is pulled up to determine if the liquid level is sufficient for each cell in the battery.

2. A combined device for covering the opening ports for all the cells of a battery, comprising a flat bar extending over all the ports of the battery, a gasket for each port and secured to the under side of the bar, means to secure the bar with the gasket for each port so that when operated the bar and gasket will be lifted from the ports of all the cells, a liquid level gage extending through each port into the fluid in the battery and secured in the bar and extending through the gasket, and means connected to the bar to raise the gages when the bar is pulled up.

3. A combined device for covering the opening ports for all the cells of a battery, comprising a flat bar extending over all the ports of the battery, a gasket for each port and secured to the under side of the bar, means to secure the bar with the gasket for each port so that when operated the bar and gasket will be lifted from the ports of all the cells, a liquid level gage extending through each port into the fluid in the battery and secured in the bar and extending through the gasket, each gage being in the form of a tube closed at both ends and having a vent near the ends of each tube, and means connected to the bar to raise the gages when the bar is pulled up.

4. A combined battery handle and cover for the cells of the battery comprising a bar extending across the length of the battery and over the openings of the cells of the battery, means to pivot the bar on the battery, a handle for the bar, a gasket secured to the bar and adapted to seat on the outer ends of the openings of the cells, means to releasably lock the handle on the battery, a tubular transparent member suspended from the bar for each opening and each tubular member being closed at each end with a small vent hole at each end to permit the entry of battery fluid into each tubular member so that when the latter are lifted out of the respective openings the fluid level in the battery may be determined, and means connected to the bar to raise the gages when the bar is pulled up.

5. A battery lifter and sealing device comprising a bar member extending over a plurality of filling openings for the cells of the battery and having a gasket to seal the openings, a pair of arch-shaped members pivoted at one end to a battery case and the other end to releasable member on the battery case, a handle secured to the arch-shaped members to act as a lifting and conveying means for the battery, a plurality of gages secured to the bar member with one for each opening and extending through the opening and into the liquid in the battery to permit inspection as to the liquid level in all the cells of the battery, and means connected to the bar to raise the gages when the bar is pulled up.

6. A battery lifter and sealing device comprising a bar member extending over a plurality of filling openings for the cells of the battery and having a gasket to seal the openings, a pair of arch-shaped members pivoted at one end to a battery case and the other end to releasable member on the battery case, a handle secured to the arch-shaped members to act as a lifting and conveying means for the battery, a plurality of gages secured to the bar member with one for each opening and extending through the opening and into the liquid in the battery to permit inspection as to the liquid level in all the cells of the battery, each gage being in the form of a tube with upper and lower openings therein, and means connected to the bar to raise the gages when the bar is pulled up.

References Cited

UNITED STATES PATENTS

| | | | |
|---|---|---|---|
| 2,671,819 | 3/1954 | Field | 136—170 |
| 3,079,887 | 3/1963 | Dawkins | 136—182 |
| 3,093,515 | 6/1963 | Rector | 136—170 |
| 3,093,516 | 6/1963 | Hennen et al. | 136—182 |

ALLEN B. CURTIS, *Primary Examiner.*

WINSTON A. DOUGLAS, *Examiner.*

C. F. LEFEVOUR, *Assistant Examiner.*